(12) United States Patent
Malard et al.

(10) Patent No.: US 6,722,194 B2
(45) Date of Patent: Apr. 20, 2004

(54) PROCESS FOR DETECTING FLATNESS DEFECTS

(75) Inventors: Thierry Malard, L'Isle Adam (FR); Jean-Paul Faure, Eragny/Oise (FR)

(73) Assignee: Vai Clecim le Polyedre, Nanterre (FR)

( * ) Notice: Subject to any disclaimer, the term of this patent is extended or adjusted under 35 U.S.C. 154(b) by 0 days.

(21) Appl. No.: 10/118,336

(22) Filed: Apr. 9, 2002

(65) Prior Publication Data

US 2002/0178840 A1 Dec. 5, 2002

(30) Foreign Application Priority Data

Apr. 10, 2001 (FR) .......................................... 01 04903

(51) Int. Cl.⁷ .............................................. G01L 5/04
(52) U.S. Cl. ...................................................... 73/159
(58) Field of Search ............................ 73/862.391, 826, 73/827, 828, 829, 862.451, 159, 160

(56) References Cited

U.S. PATENT DOCUMENTS

| 3,324,695 A | | 6/1967 | Sivilotti | |
|---|---|---|---|---|
| 3,703,097 A | * | 11/1972 | Kilpatrich et al. | ............ 73/159 |
| 4,116,029 A | * | 9/1978 | Fabian et al. | ............... 72/31.01 |
| 4,356,714 A | * | 11/1982 | Quehen | ........................ 72/11.7 |
| 4,836,680 A | * | 6/1989 | Troster et al. | ............... 356/613 |
| 4,841,767 A | * | 6/1989 | Morel | ......................... 73/159 |
| 5,537,878 A | * | 7/1996 | Sendzimir et al. | ..... 73/862.391 |
| 5,699,160 A | * | 12/1997 | Barenboim et al. | ......... 356/495 |

FOREIGN PATENT DOCUMENTS

DE          197 47 655          5/1999

* cited by examiner

*Primary Examiner*—Max Noori
(74) *Attorney, Agent, or Firm*—Arent Fox Kintner Plotkin & Kahn, PLLC

(57) ABSTRACT

The object of the invention is a process for detecting latent flatness defects in a band product (2) applied under tensile load to an angular sector (A) of measuring roll (1) comprising a plurality of detection zones (4) spaced apart each comprising a transmission sensor (3), at each rotation, of a measurement signal having a value under load (i) which is compared, at each rotation, with a reference value, in order to assess, in each longitudinal zone of the band (2), information representative of the tensile load applied in this zone.

According to the invention, two values in empty condition ($i_1$, $i_2$) of the signal transmitted by each sensor (3) are measured, respectively before and after the corresponding detection zone (4) passes through the angular application sector (A) of the band (2) and the reference value ($i_0$) to which is compared, at each rotation, the value under load (i) of the signal transmitted by each sensor (3) is obtained by combination of said values in empty condition, respectively preceding ($i_1$) and subsequent ($i_2$).

7 Claims, 2 Drawing Sheets

PROCESS FOR DETECTING FLATNESS DEFECTS

The invention concerns a process and a device for detecting latent flatness defects of a metal band product running along a longitudinal direction.

When rolling metal bands, and notably thin rolled sheet, flatness defects may be observed once the band is in resting position, but that may be in latent condition in the band, as said band is maintained under tensile load. Such defects are due generally to small variations over the width of the band, to the elongation carried out by the rolling process and may be corrected while acting on the rolling conditions and, in particular, on the distribution, in the transversal direction, of the clamping pressure applied between the working rolls.

To that effect, modern rolling mills are fitted, usually, with means enabling to correct the gap profile to the let the product through Often, the stand of the rolling mill is fitted with actuators bearing upon the chocks of the working rolls in order to bring said rolls closer or apart, with a cambering effect of the rolls.

In another arrangement, fractional spraying means enable to act thermally on the profile of the rolls.

It is thus possible to act on the profile of at least one back-up roll which comprises a ductile envelope mounted to rotate around a fixed shaft and bearing upon said shaft by a plurality of actuators whereof the position and the pressure are adjustable, whereas said actuators are distributed over the width of the band.

Usually, these means of adjustment are controlled thanks to information given by a measuring device placed downstream of the rolling mill and sensitive to the variations, over the width of the band, of the tensile load applied to said band, which correspond themselves to the variations in elongation of the longitudinal fibres of the band.

Such a measuring device consists, generally, of a deflector roll comprising a cylindrical body mounted to rotate around an axis perpendicular to the longitudinal running direction of the band. Said band is applied under tensile load to an angular sector of the external surface of the roll that is fitted with a series of sensors enabling to measure the variations in the local application pressure of the band. These detectors are spaced from one another and distributed over the whole length of the roll, whereas the band is divided into a series of longitudinal zones each corresponding to a detection zone whereof the width is set, whereon the measurement conducted by the sensor is integrated in order to assess the latent defect to be corrected in the corresponding longitudinal zone.

To avoid interferences between the measurements conducted on two adjacent measuring zones, the sensors are advantageously offset angularly from one zone to the next.

Generally speaking, a measuring roll comprises therefore a plurality of detection zones distributed over its whole length and each fitted with a sensor for transmitting a signal related to the application pressure of the corresponding section of the band, when this detection zone passes through the angular sector where the band is in contact with the roll.

As the band is under tensile load, the roll must sustain the deflection and comprises therefore, usually, a central tubular body of sufficient thickness to provide the necessary strength and fitted, on its external surface, with a plurality of recesses wherein the measuring sensors are located, whereas each recess is enclosed, outwardly, by a protection wall to avoid direct contact between the sensor and the running band.

In certain arrangements known, the pressure applied by the band in the detection zone is measured directly by means of a strength sensor, for example of the piezo-electric or quartz type, which is interposed between the bottom of the recess and the protection wall whereon the band is applied.

To obtain information directly representative of the pressure applied, the protection wall may consist of the external surface of a cap-shaped piece that encloses the recess outwardly but a slight clearance ought to be left between this cap and the lateral surface of the recess, a clearance that may be filled with dirty particles (DE-A-19747655).

In certain arrangements known, the protection cap consists of a wall imbedded in a countersink provided on the periphery of the recess. However, as the sensor is clamped between the bottom of the recess and the protection wall which rest on the bottom of the countersink, the pressure measurement is disturbed by deflection resistance of this wall.

To remedy these shortcomings, it has been suggested in the document U.S. Pat. No. 3,324,695, to cover the roll with a continuous envelope applied onto the external surface of the resistant body of the roll as a hoop, whereas each recess of a sensor is covered by a portion of this envelope forming a thin protection wall.

In such a case, as described, for example, in document U.S. Pat. No. 4,356,714, the pressure applied by the band is not measured directly, but the deformation of the thin wall resulting from this pressure, by means of a position sensor having two elements mounted to slide radially one inside the other and resting, in opposite directions respectively, on the bottom of the recess and on the internal surface of the thin wall, in the centre of said wall.

This thin wall stretched above the sensor and sensitive to the pressure applied by the product, behaves like a plate imbedded on its edges and the conventional formulae in the mechanics of materials enable therefore to assess the pressure applied onto the ductile wall from the deflection measured at the centre of the plate.

Advantageously, the position sensors may be of the <<LVDT>> type, having a primary winding and two secondary windings mounted opposite one another, between which variable magnetic coupling is created by a mobile core linked with the displacement of the stem of the sensor.

The roll is associated with an automatic measuring system which enables, at each rotation, to send a measuring pulse to the primary winding of each sensor and to read the induced signal at the terminals of the secondary windings. An angular position encoder enables to conduct the measurement under load when each sensor passes through an application zone of the band. Another measurement is conducted in empty condition when the sensor is situated inside the angular application sector. The difference between the measurement under load and the measurement in empty condition provides the deflection at the centre of the plate, from which the pressure applied can be determined and, consequently, the tensile load in the corresponding longitudinal zone of the band.

The measurement in empty condition can be conducted in any angular position of the roll which does not correspond to the measurement under load for one of the sensors. Said sensors are therefore distributed judiciously on the surface of the roll in order to enable easy management of the measurements in empty condition and under load, during a rotation of the roll (U.S. Pat. No. 4,356,714).

Until now, such flatness measurement rolls had only been used in cold rolling facilities for which the temperature of the band remains moderate.

Indeed, if a pressure sensor clamped between the bottom of the recess and the closing cap of said recess is used, the expansions of the different parts, in case of rising temperature, may cause excessive friction and, consequently, faulty measurements.

This shortcoming does not exist in the systems where position sensors covered with a closing plate are used. However, this plate consists of a thin wall which takes on the temperature of the band immediately and is therefore subject to thermal deformation. Moreover, as the rotational speed is high, the centrifugal force may also induce a slight deformation.

The comparison of the value under load of the signal with a value in empty condition measured at each rotation, enables to reset the sensor and to measure the actual deflection of the plate, but to do so, the body of the roll should remain at substantially constant temperature and this is only valid if the temperature of the band is moderate.

However, even in cold rolling facilities, the reduction in thickness induces certain heating-up of the band whereof the temperature may be close to 200° C.

On the other hand, the flatness defects resulting from variations in elongation over the width of the band also appear during hot rolling and it would be therefore interesting to measure, as of that moment, the risks of future defects in order to correct them.

However, even for a non-ferrous metal such as aluminium, the hot band is at high temperature, around a few hundred degrees. If, for measuring, pressure sensors are used, it should be contemplated to cool each sensor down, for example by circulating a cooling fluid such as water. But the realisation of a roll fitted with cooling circuits is very complex.

The position sensors do not have this shortcoming as they may be provided to operate even at high temperatures since they consist, simply, of two elements sliding one into another. However, in case of high temperature, the thermal deformations of the closing plate of each recess are relatively important.

It ensues that, until now, it had not seemed possible to use flatness measuring rolls of conventional type in the case of hot rolling.

It is an object of the invention to solve these problems thanks to a new process that enables to realise accurate measurements of the distribution of the loads on a band even if said band is at high temperature.

The invention is therefore particularly suited to hot rolling facilities for which, until now, it seemed impossible to use an flatness roll.

However, because of the advantages obtained and the simplicity of the means employed, the invention can also be applied to cold rolling facilities since it enables to improve the accuracy of the measurement and, consequently, of the correction of flatness.

Besides part, the arrangements according to the invention enable to assess a variation profile of the temperature of the band over the width of said band in order to take said profile into account for correcting flatness defects.

The invention applies therefore, generally speaking, to a process for detecting latent flatness defects in a band product running along a longitudinal direction and applied under tensile load to an angular sector of a measuring roll comprising a cylindrical body mounted to rotate around an axis perpendicular to the running direction and having a external surface along which are distributed a plurality of detection zones centred on transversal planes spaced from one another and each comprising a transmission sensor, at each rotation, of a signal having a value measured under load, corresponding to the pressure applied to the detection zone by a corresponding longitudinal zone of the band when the detection zone passes through the angular sector of application of the band, a process wherein, at each rotation, the value measured under load of the signal transmitted by each sensor is compared with a reference value, in order to assess, in each longitudinal zone of the band, information representative of the tensile load applied in this zone.

According to the invention, two values in empty condition of the signal transmitted by each sensor are measured, respectively before and after the corresponding detection zone has passed through the angular sector of application of the band and the reference value to which is compared, at each rotation, the value under load of the signal transmitted by each sensor is obtained by combining said two values in empty condition, respectively preceding and subsequent of the signal transmitted by the same sensor.

Preferably, both values in empty condition of the signal are measured, respectively, immediately before and immediately after the corresponding detection zone has passed through the application sector of the band.

Practically, the reference value can be equal to the arithmetic average of both values in empty condition, respectively before and after the measurement under load. However, it is possible to combine both values in a different fashion in empty condition while weighing said values in order to take into account the temperature evolution during the rotation of the roll.

The invention is particularly suited to the flatness measuring rolls wherein the deformation of the protection wall in the centre of each detection zone is measured by means of a position sensor having one element resting at the bottom of the recess and one element resting on the protection wall. However, the invention also exhibits advantages for the other types of rolls since it enables, generally speaking, to improve the measurement accuracy.

The invention enables to control the flatness of a hot-rolled sheet, which did not seem possible previously. In such a case, it is particularly advantageous to realise forced cooling of the external surface of the roll over a sector of said surface extending between the zones where both values in empty condition of the signal transmitted by each sensor are measured, in order to bring the temperature of the roll down to substantially constant level before the detection zone is brought back within the application sector.

However, the invention may also be applied advantageously to cold rolling since it enables to improve the accuracy of the flatness measurement.

But the invention also exhibits other advantages. In particular, on the basis of the variation profile of the subsequent values in empty condition measured after each sensor has passed through the application sector, the temperature variation profile is assessed over the width of the band in order to deduce the influence of the thermal dilatation of each longitudinal zone on the flatness measurement performed in this zone, so that the flatness corrections assessed, for each zone, on the basis of said flatness measurement, correspond to an average temperature valid over the whole width of the band.

Thus, the flatness corrections can be determined in order to perform on the different longitudinal zones of the band in order to obtain the requested flatness profile on a sheet with homogeneous temperature and even after cooling at room temperature.

But the invention will be understood better by the following description of a particular embodiment, given for exemplification purposes, with reference to the appended drawings.

Figure 3:
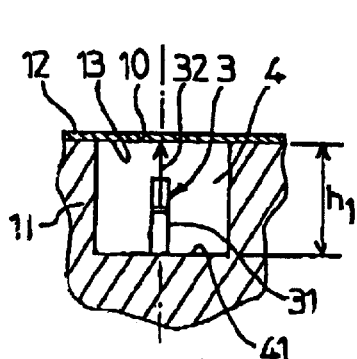
Figure 4:
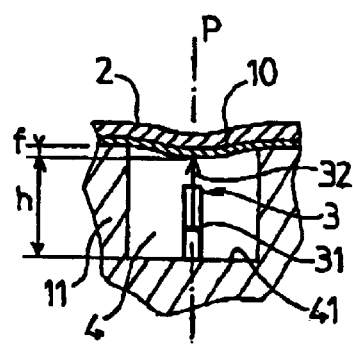

FIG. 3 and the FIG. 4 are schematic sectional views of a detection zone, respectively before and during the passage of said zone through the application sector.

Figure 5:
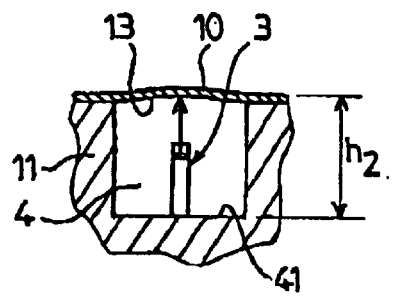

FIG. 5 is a sectional view of a detection zone just after passage through the application sector.

Figure 6:
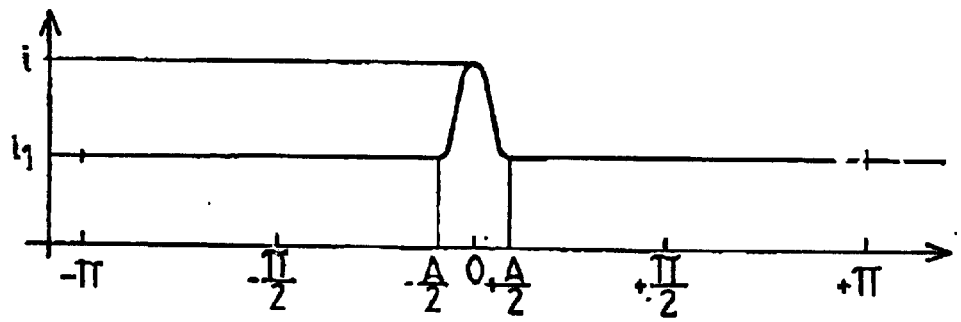

FIG. 6 is a diagram showing the amplitude variation of the measurement signal during a rotation of the roll.

Figure 7:
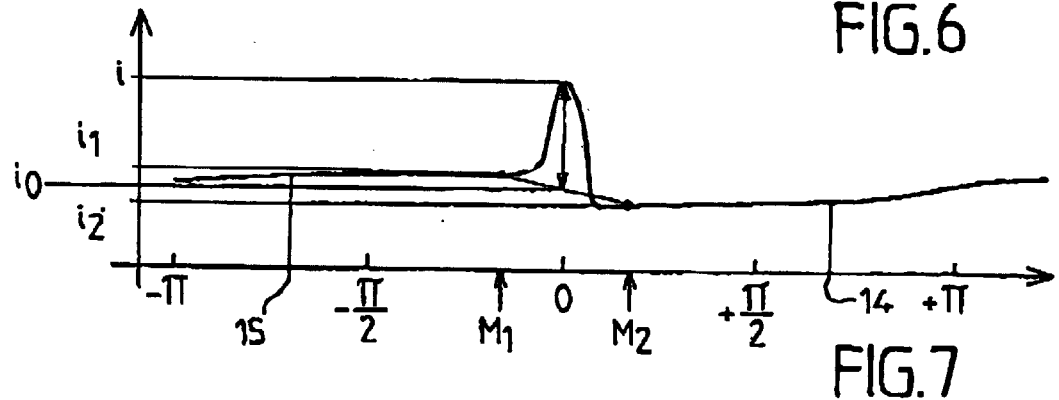

FIG. 7 is a diagram showing the amplitude variation of the measurement signal during a rotation of the roll, in the case of a band at high temperature.

Figure 8:
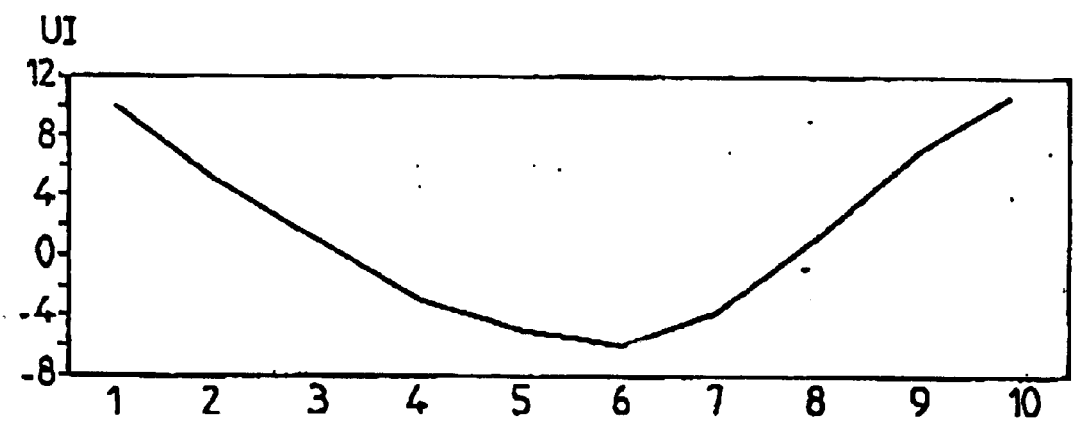

FIG. 8 is a diagram showing the variation profile of the flatness measurement for a hot-rolled sheet.

Figure 9:
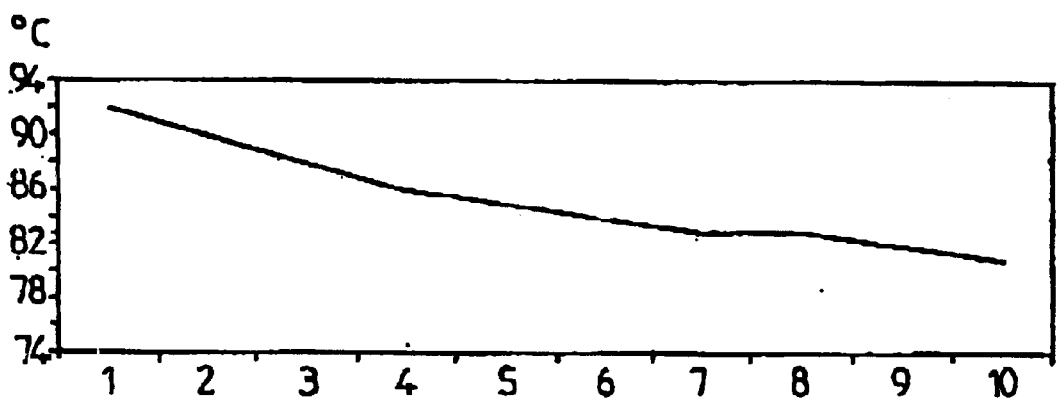

FIG. 9 shows the variation profile of the temperature of the sheet over the width of said sheet.

Figure 10:
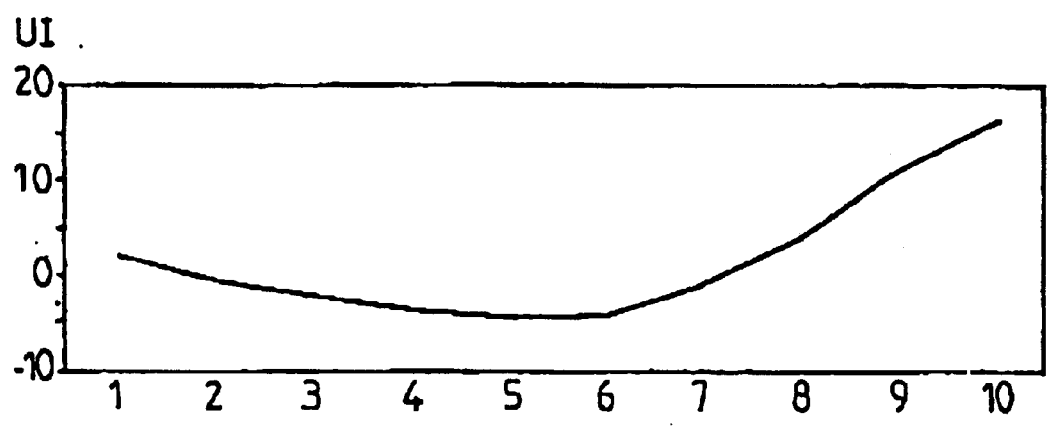

FIG. 10 shows the variation profile of the flatness measurement for a sheet with homogeneous temperature.

Figure 1:
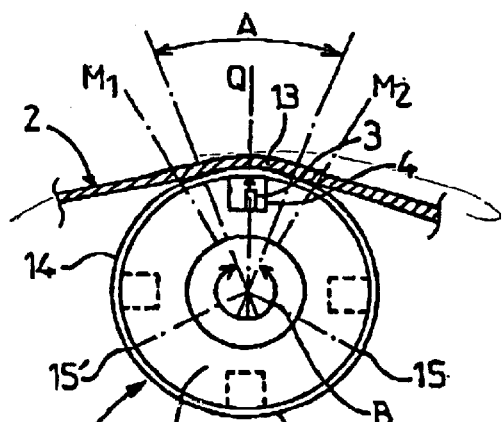
FIG. 1 is a transversal sectional view of an flatness roll.
Figure 2:
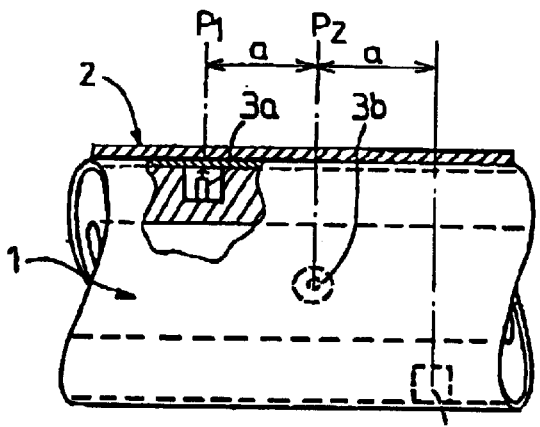
FIG. 2 is a front view, partially exploded.

FIGS. 1 and 2 represent schematically a flatness measuring roll 1 whereon is applied under tensile load a band 2 covering an angular sector A of the roll.

The roll 1 consists, in a known fashion, of a resistant tubular body 11 covered with a thin hooped envelope 12.

The roll 1 is fitted with a plurality of measuring sensors 3 each located in a recess 4, for example a blind hole drilled into the resistant body 11, whereas this recess is enclosed, outwardly, by a section 10 of the thin envelope 12 forming a protection wall of the sensor 3.

As shown on FIG. 2, the sensors 3 are spaced axially by a pitch (a) and distributed as a helix over the whole length of the roll, whereas two neighbouring sensors 3a, 3b are offset angularly for easier processing of the measurements.

All these arrangements are well known and do not require a detailed description.

As shown schematically on FIGS. 3, 4, 5, each sensor 3 is interposed between the bottom 41 of the corresponding recess 4 and the internal surface 13 of the section 10 of the envelope 12 which encloses the recess 4 outwardly.

In a particularly advantageous embodiment, subject matter of the document FR-A-2366366, each sensor 3 is a position sensor centred on the axis of the recess 4 and comprising a fixed element 31 resting at the bottom 41 of the recess 4 and a mobile element 32 enclosing a feeler resting at the centre of the protection wall 10.

Generally speaking, the external surface 12 of the roll 1 comprises a section 13 in contact with the band 2, which covers an angular sector of application A, centred on a plane Q going through the axis of the roll and a section 14 spaced from of the band and covering a free sector B=2π−A.

Before the detection zone 4 passes through the application sector A (FIG. 3), the centre of the internal surface 13 of the plate 10 is situated at a distance $h_1$ from the bottom 41 of the recess 4, which corresponds to the unfolded length of the position sensor 3.

When the sensor 3 passes through the application sector A of the band 2 (FIG. 4), the pressure exerted by said band determines a slight sagging of the plate 10 and, the distance from the centre of said plate to the bottom 41 of the recess is reduced to h.

The feeler 32 enables therefore to measure the deflection $(f=h_1-h)$ in the centre of the wall 10. Since the envelope 12 is hooped on the resistant body 11, whereas each section 10 enclosing a recess 4 forms a thin plate imbedded on its periphery whereof the deformation under the effect of the loads applied can be calculated, by application of the strength of materials rules. Thus, the pressure applied by the band 2 on the plate 10 can be derived therefrom as, consequently, the tensile load in a corresponding longitudinal zone of the band 2 centred on the plane P going through the axis of the sensor 3 and orthogonal to the axis of rotation of the roll 1.

Each sensor 3 transmits a measurement signal whereof the amplitude depends on the position of the feeler 32 with respect to the fixed element 31 and varies, therefore, periodically at each rotation of the roll.

This variation in amplitude is represented schematically on the diagram of FIG. 6 which indicates, in ordinate, the amplitude of the measurement signal transmitted by the sensor in relation to the angular position of said signal indicated in abscissa.

At each rotation of the roll, as long as the sensor 3 is situated in the free sector B, the signal transmitted exhibits a value in empty condition $i_1$ corresponding to the length $h_1$ covered by the sensor 3. When said signal reaches the application sector A, the amplitude of the measurement signal increases rapidly up to a value under load i corresponding to the passage, on the plane of symmetry Q, of the sensor 3 whereof the length is then reduced to h by reason of the penetration of the plate 10. The amplitude of the signal then diminishes to come back to the value in empty condition $i_1$ as soon as the sensor has left the application sector A.

In the usual case of usage of an flatness roll for cold rolling, as described in the document U.S. Pat. No. 3,324,695, it can be assumed that the protection wall 10 behaves like an elastic plate, which comes back to its stretched position of FIG. 3 as soon as the detection zone has left the application sector of the band.

As shown on FIG. 6, the value in empty condition $i_1$ of the signal, measured at each rotation of the roll and corresponding to the length $h_1$, is therefore substantially constant and constitutes a reference value wherewith the value under load i of the signal transmitted at each rotation can be compared. The value of the deflection (f) on each transversal plane P1, P2 of the roll can then be calculated to deduce the distribution of the pressures and, consequently, the tensile loads over the width of the band.

However, for the value in empty condition $i_1$ of the measurement signal to remain substantially constant, the band 2 must remain at moderate temperature.

Still, each section 10 of the envelope 12 enclosing a recess 4 constitutes a thin plate which takes on immediately the temperature of the band when the recess 4 passes through the application sector A. As a result, the plate tends to expand.

Consequently, when leaving the application sector, the application plate 10 which is not covered by the band 2 any longer is deformed and the centre of the plate 10 comes back to a distance $h_2$ from the bottom 41 of the recess 4.

If the band 2 shows a relatively high temperature, this expansion is significant and the distance $h_2$ is greater than the initial distance $h_1$ before the sensor reaches the application zone A (FIG. 5).

The diagram of FIG. 7 illustrates, in such a case, the variation in amplitude of the measurement signal transmitted by the sensor. As previously, the preceding value in empty condition of the signal transmitted by the sensor before entering the application sector A, is equal to $i_1$ and this value increases gradually as the detection zone 10 enters the sector A until a value under load i corresponding to the passage of the sensor through the plane of symmetry Q. The amplitude of the signal then diminishes down to a subsequent value in empty condition $i_2$ which corresponds to the distance $h_2$ between the centre of the plate 10 and the bottom 41 of the recess. As shown on FIG. 5, further to the expansion of the plate 10, the feeler 32 comes back to a retracted position with respect to the initial position of FIG. 3 and the subsequent value in empty condition $i_2$ of the signal is therefore smaller than the preceding value in empty condition $i_1$.

However, the thermal inertia of the thin plate 10 is very small with respect to that of the resistant body 11 of the roll. Consequently, the plate 10 is cooled down rather quickly in open air when rotating in the free sector B and comes back to the stretched position of FIG. 3, whereas the feeler 32 comes back to its initial position with respect to the fixed element 31. As shown on FIG. 7, the amplitude of the signal increases therefore gradually up to the preceding value in empty condition $i_1$ at the end of the free sector B.

Normally, if the band remains at moderate temperature, for example in the order of 200° C., air cooling, in the free sector B is sufficient. However, there may also be gradual heating-up, with a slight expansion, of the resistant body 11 and the length $h_1$ of the sensor can therefore vary slightly, as well as the value in empty condition $i_1$ of the signal transmitted.

Besides, in the case of hot rolling, the temperature of the band is much higher and natural cooling of the roll is not sufficient any longer to maintain its temperature.

It is then preferable to realise forced cooling of the external surface 12 of the roll 1 over a section of the free sector B, for example in the manner described in the French patent application N°0013495 of the same company. For example, the roll can be cooled by immersion of the lower section of said roll between two generatrixes 15, 15' spaced symmetrically with respect to the median plane Q (FIG. 1). It ensues, as shown on FIG. 7, that the curve representative of the measurement signal increases gradually up to the preceding value $i_1$.

However, even with a forced cooling, it is not easy to maintain the temperature of the external surface of the roll at constant level.

The invention enables to remedy this shortcoming while preparing a reference value on the basis of two values in empty condition measured respectively, before and after the sensor has passed through the application sector.

Preferably, as shown on FIG. 1, both these values in empty condition will be measured at both ends of the free sector 14, respectively in a position M1 placed immediately before entering the application sector A and in a position M2 placed immediately after leaving the application sector. For example, these positions M1 and M2 can be spaced symmetrically by an angle of 5 to 10° on either side of the limits of the application sector A.

On the basis of both these measurements in empty condition, a reference value $i_0$ is prepared, with which the value under load i will be compared. Quite simply, this reference value $i_0$ can be equal to the arithmetic average $$\frac{i_1 + i_2}{2}$$

of both values in empty condition, respectively preceding and subsequent values.

Thus, the possible variations of both empty values $i_1$ and $i_2$ can compensate one another and it appears that, even in the case of hot rolling for which it is particularly difficult to control the temperature of the roll, the reference value thus prepared remains substantially constant for each sensor. It is therefore possible to perform efficient calibration of the measurements with resetting the sensor at each rotation.

Besides, even in the case of cold rolling, the invention enables to be free from inevitable fluctuations of the value measured in empty condition and, consequently, to increase substantially the accuracy of the measurements conducted.

But the invention provides another advantage important for obtaining the requested flatness.

Until now, indeed, the flatness corrections were performed on the basis of information given by the measuring roll while considering that all the fibres of the band are situated at homogeneous temperature.

Still, it has been noted that, when leaving the rolling process, the temperature of the band may vary in the transversal direction, between the edges and the central section and becomes homogeneous only at a later stage.

For example, it is known that, in a rolling mill, it is necessary to control the rotation of the rolls. To this effect, at least one of the rolls, generally a backup roll, is linked by an extension to a control engine placed on one side of the stand called a driving side, the auxiliary members, whereby for example the means for changing the rolls are placed on the other side, called an operating side, and it appears that, generally, the band is warmer on the driving side.

As it is known, the unequal distribution of the tensile loads, over the width of the band corresponds to slight differences in length between the different longitudinal fibres of the band, which produce flatness defects when the tensile load has been suppressed. The flatness correction consists therefore, during the rolling process, in acting on the distribution of the loads in relation to the measurements performed by the flatness roll, in order to compensate for the latent defects thus detected.

Still, it has been noted that a portion of the differences in length between the various fibres, at the origin of these latent defects, might result, simply, from unequal expansions of the fibres at slight different temperatures and that corrections performed as usual, while assuming homogeneous temperature of the band, do not correspond exactly to the defects resulting only from unequal distribution of the rolling load over the width of the band.

For exemplification purposes, it is known that by convention, the flatness measurement which enables to determine the corrections to be performed over the different fibres of the band is expressed as <<I Units >>. However, it can be shown that, for a steel band whereof the expansion coefficient is $1.2 \times 10^{-5}$, a difference of 1° C. between the temperatures of two longitudinal fibres of the band creates an error de 1.2 I Unit on the flatness measurement. Still, the measurements performed on a cold rolled band whereof the average temperature is in the order of 100° C., show that there may be a temperature difference in the order of 5 to 10° C. between the lateral edges and the central section. It appears therefore that the error on the flatness measurement due to this temperature difference is significant.

Consequently, the flatness corrections performed on the basis of these measurements may not be appropriate and, after cooling, residual defects may subsist, when the coil is unwound again.

The invention enables to remedy such shortcomings while taking into account this variation in temperature in the transversal direction, to determine the flatness corrections to be performed.

As specified, indeed, the section 10 of the envelope 12, extending above each sensor, takes on immediately the temperature of the band and expands accordingly. Consequently, the distance $h_2$ between the bottom 41 of the recess and the centre of the plate 10, which is measured immediately after the detection zone has passed through the application sector A, is representative of the temperature of the band 2 in the corresponding longitudinal zone.

Thus, the subsequent empty value $i_2$ of the signal transmitted by each sensor depends on the temperature of the band in the corresponding longitudinal zone.

It is therefore possible, on the basis of the variation profile of the subsequent empty values measured after each sensor has passed through the application sector, to determine the variation profile of the temperature over the width of the band in order to deduce therefrom the influence of the thermal expansion of each longitudinal zone of the band on the flatness measurement which determines the correction to be performed in this zone.

Thus, in the flatness measurement which is determined, for each longitudinal zone, on the basis of the value under load of the measurement signal, it is possible to take in account the part corresponding to the dilatation, in order to assess the corrections which ought to be performed on a band having a homogeneous temperature over its whole width.

The steps of this process are illustrated by the diagrams of FIGS. 8, 9, 10 which have been established for a Steel band, in the case of a flatness roll comprising ten detection zones distributed over the width of the band.

FIG. 8 shows the variation, over the width of the band, of the flatness measurement expressed in I Unit and indicated in ordinate, whereas this measurement is conducted, for each detection zone, by comparison between the value under load of the measurement signal and the average of both respectively preceding and subsequent values in empty condition.

FIG. 9 shows the variation of the temperature determined, for each zone, on the basis of subsequent measurements in empty condition, and indicated in ordinate on the diagram.

FIG. 10 has been obtained by combination of both curves of FIGS. 8 and 9 and indicates the equivalent flatness of the band, whereas each measurement in a zone is corrected in order to compensate for the effect of the temperature in this zone, only to take into account the effect of unequal distribution of the loads over a band with homogeneous temperature.

Obviously, the invention is not limited to the sole embodiments which have just been given for exemplification purposes and could be subject to variations without departing from the protection framework defined by the claims.

Thus, FIGS. 8 to 10 have been established for a steel band at a temperature in the order of 100° C., but the process also applies to a hot band having high temperature. The curves would be, simply, slightly different Besides, it is easier to determine the reference value to which is compared each signal under load to the arithmetic average of both respectively preceding and subsequent measurements in empty conditions. However, it would be possible to perform another combination of both measurements in empty condition while weighing said measurements the better to take into account the evolution of temperature during the rotation of the roll.

The reference signs inserted after the technical features mentioned in the claims solely aim at facilitating the understanding of the said and do not limit their extent whatsoever.

What is claimed:

1. A process for detecting latent flatness defects in a band product running along a longitudinal direction and applied under tensile load to an angular section of a measuring roll comprising a cylindrical body mounted to rotate around an axis perpendicular to the running direction and having an external surface along which are distributed a plurality of detection zones centred in transversal planes spaced from one another and each comprising a transmission sensor, at each rotation, of a measurement signal having a value under load, corresponding to the pressure applied to the detection zone by a corresponding longitudinal zone of the band when the detection zone passes through the angular application sector of the band, a process wherein, at each rotation, the value under load of the measurement signal transmitted by each sensor is compared with a reference value, in order to assess, in each longitudinal zone of the band, information representative of the tensile load applied in this zone, characterised in that two values in empty condition of the signal transmitted by each sensor are measured, respectively before and after the corresponding detection zone passes through the angular application sector of the band and the reference value to which is compared, at each rotation, the value under load of the signal transmitted by each sensor is a combination of both values in empty condition, respectively preceding and subsequent, of the signal transmitted by the same sensor.

2. A process according to the claim 1, characterised in that both values in empty condition of the signal transmitted by each sensor are measured, respectively, immediately before and immediately after the corresponding detection zone passes through the application sector of the band.

3. A process according to one of the claims 1 and 2, characterised in that the reference value is equal to the arithmetic average of both values in empty condition, respectively preceding and following the measurement under load.

4. A process according to claim 1, characterised in that each detection zone comprises a sensor placed in a recess provided in the body of the roll and covered by a closing plate of the recess placed in the alignment of the external surface of the roll and the variations in position of the center of the detection zone are measured by means of a position sensor having a first element resting on the bottom of the recess and a second element resting on the closing plate, in the center of said plate.

5. A process according to claim 1 or 4, characterised in that forced cooling of the external surface of the roll is applied to a sector of said surface extending between the zones where both values in empty condition of the signal transmitted by each sensor are measured, in order to bring the temperature of the roll back to substantially constant level before the detection zone comes back to the application sector.

6. A process according to the claim 4 characterised in that, on the basis of the variation profile of the preceding values in empty condition measured after each sensor passes through the application sector, the variation profile of the temperature is determined over the width of the band in order to derive therefrom the influence of thermal expansion of each longitudinal zone on the flatness conducted in this zone, so that the flatness corrections determined, for each zone, on the basis of information given by the measuring roll, correspond to a homogeneous temperature of the band over its whole width.

7. A process according to the claim 6 characterised in that the flatness corrections are determined for each zone while taking account of the temperature variation and enable to adjust the requested flatness of the band after cooling.

* * * * *